July 30, 1935. P. S. SHIELD 2,009,638
FLUID PRESSURE CONTROL SYSTEM FOR VALVES
Filed Sept. 19, 1931  2 Sheets-Sheet 2
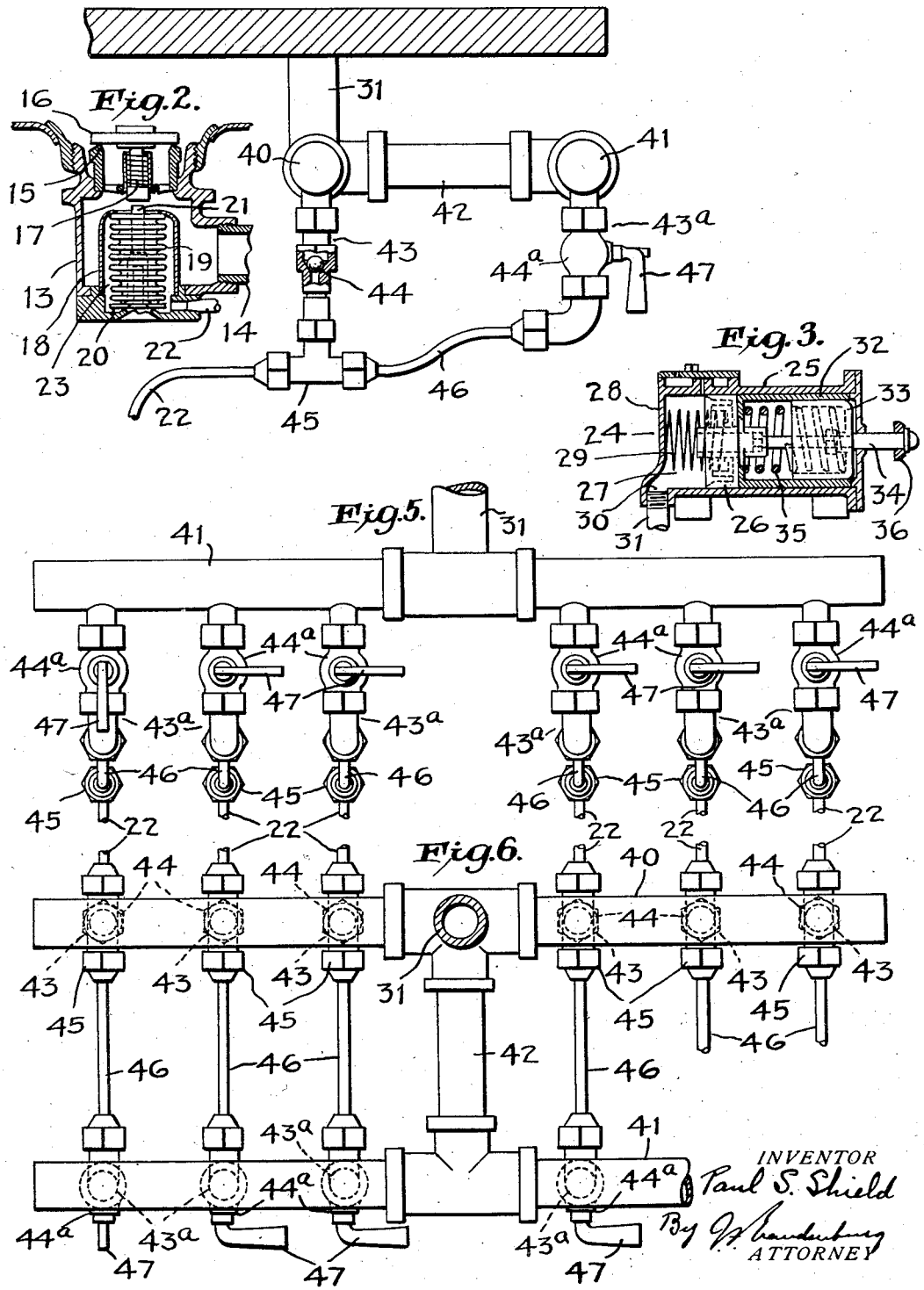
INVENTOR
Paul S. Shield
By
ATTORNEY Patented July 30, 1935

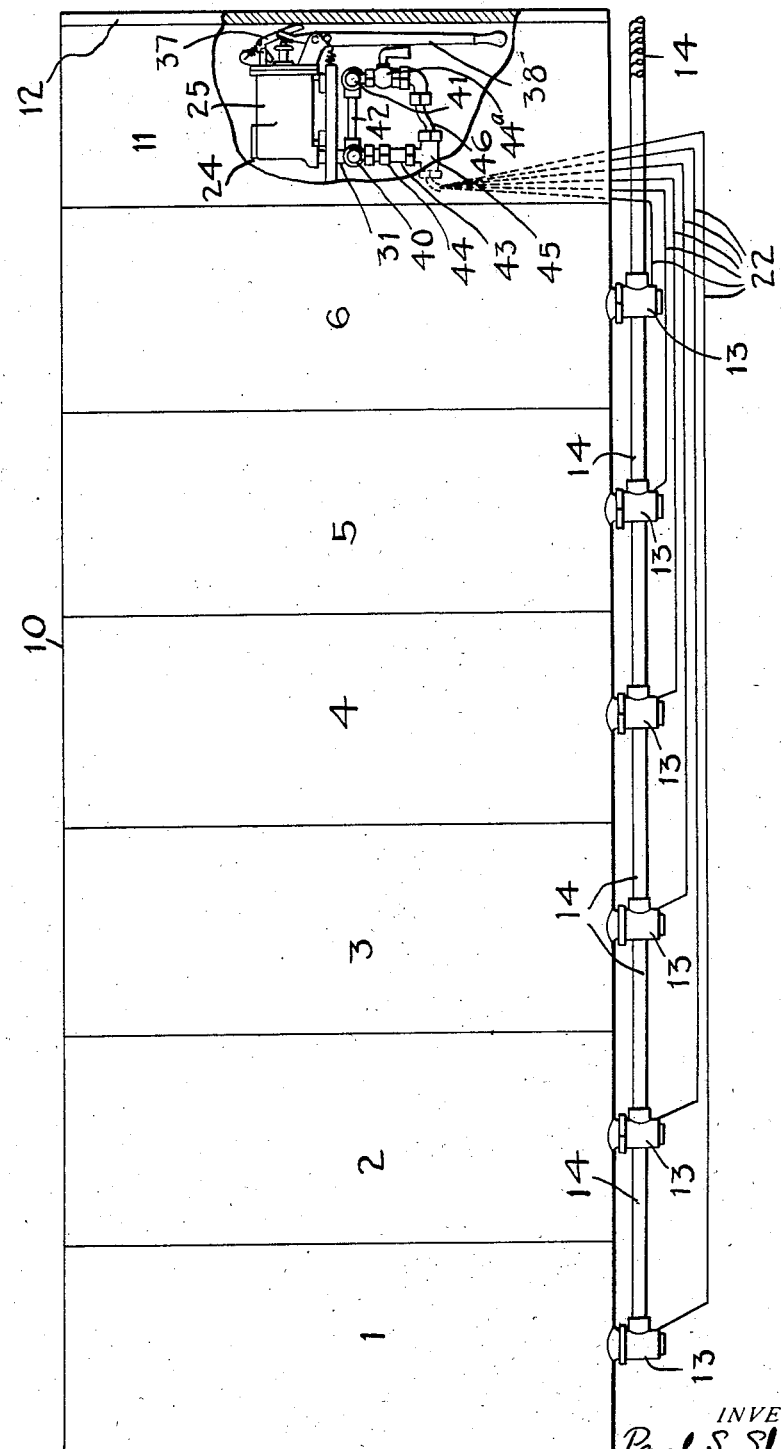

2,009,638

UNITED STATES PATENT OFFICE 2,009,638

FLUID PRESSURE CONTROL SYSTEM FOR VALVES

Paul S. Shield, Cincinnati, Ohio, assignor to Augustine Davis, Jr., Cincinnati, Ohio Application September 19, 1931, Serial No. 563,796

10 Claims. (Cl. 137—21)

The invention relates to a fluid-pressure system, more especially a hydraulic system, for operating a plurality of valves. It relates more particularly to the operation or control of the safety outlet valves of the compartments of a multiple-compartment truck tank or the like.

The object of the invention is to provide a selective apparatus of very simple and inexpensive construction, which is also convenient to operate and not likely to get out of order, and which enables any one or any combination of the valves to be operated, at will, and which guards against the danger of any valve or valves being left in the operated condition when it or they should be restored to normal condition.

The system is of the type which includes an operating chamber connected by fluid lines with suitable servo-motors of the valves to be controlled. Pressure created in the operating chamber, as by means of a piston, is transmitted through the lines to the servo-motors to operate the subject valves. In a truck tank, the purpose is to open the normally-closed safety valves, which valves are "self-closing" by virtue of gravity, liquid head and/or springs, closing springs being customarily provided. When a delivery has been made from a compartment or compartments, it is important that the safety valve or valves which were opened be again closed.

In the apparatus described herein, the closing of any opened valve is brought about by retracting the plunger of the operating device, hereinafter termed the "operator", which permits liquid that was expelled from the operating chamber to return to it. Such a system can be made selective by placing a stopcock in each of the lines, but if the attendant closes a stopcock before releasing the piston of the operator, liquid will be trapped in that line and in the corresponding servo-motor, and it will be impossible for the attendant to close the safety valve by manipulating the operating device.

In the present invention this difficulty is overcome by the provision of a system of control valves which combines manual and automatic functions. By opening any one or more of a set of such valves, pressure can be transmitted to the servo-motors at the ends of those lines, to open the corresponding safety valve or valves, to unload the selected compartment or compartments. If these control valves should be closed before the piston of the operator is released, the safety valves will nevertheless be caused to close as soon as the piston is released, by reason of the automatic opening of a valve or valves of the control system. The automatic action of this valve or these valves is that of check-valves which are urged tightly closed under pressure from the operator but open readily to return flow to the operating chamber. The manual and automatic features cooperate so that only the selected safety valve or selected safety valves, and not others, will be opened when the piston of the operator is advanced, and so that any opened safety valve will surely be closed upon return of the piston.

The embodiment of the invention is susceptible of various modifications. The construction illustrated herein, while not the simplest in point of number of control valves and parts that can be employed for carrying the invention into use, is preferred because it permits of the utilization of standard articles of equipment and for that reason is easy and inexpensive to produce.

In the accompanying drawings, forming part hereof:

Fig. 1 is a side elevation of a multi-compartment truck tank having the preferred embodiment of the invention applied to it, a portion of a box at the rear end of the tank being broken out to show parts within, and the control lines being shown in a schematic manner;

Fig. 2 is a vertical sectional view of one of the safety valves and its servo-motor;

Fig. 3 is a vertical section through the operator;

Fig. 4 is a side sectional elevation at the region of the control parts;

Fig. 5 is a front elevation of this portion of the apparatus, "front" in this instance being the rear end of the tank structure; and Fig. 6 is a sectional plan view corresponding to Fig. 5, a portion, which would otherwise appear, being omitted because of lack of space.

The truck tank 10 is shown as having six compartments, designated 1—6. A box 11 housing the control portion of the apparatus is shown at the rear end of the tank, this box having a door 12.

The bottom of each tank compartment has an outlet opening and connected with it an outlet fitting and valve-body 13. This reference numeral will also be used in referring to the safety valves as units. Delivery pipes 14 extend from these fittings to the rear end of the tank, or other convenient point, where they are customarily provided with suitable delivery valves or faucets, not shown. The outlets of the tank compartments may be manifolded to a single delivery line if desired.

In each outlet fitting there is an annular valve seat 15, on which a liftable valve element 16 is normally closed. A spring 17 acting on the depending stem of the valve shown in Fig. 2 insures the closing of the valve in the absence of lifting support. Each of these safety valves has a simple form of servo-motor for raising it, to permit discharge from its tank compartment. The servo-motors may be of the piston and cylinder type or of the metal bellows type, the latter being preferred. As illustrated in Fig. 2, a casing 18 is fixed in the lower part of the fitting 13 and the upper end of the bellows 19 is fixed tightly to the upper end of this casing. The lower end of the bellows is secured to a vertically movable plate 20 carrying a post 21, which when the bellows is raised will act on the stem of the outlet valve and lift it away from its seat.

A separate hydraulic line 22 is connected with each of the fittings 13, so as to communicate with the expansible chamber 23 of the corresponding servo-motor. In the illustration there are six of these lines, corresponding to the number of compartments and safety valves.

The particular form of the safety valves and their servo-motors may be varied. The form shown is similar to the illustrations in Patents 1,781,369 and 1,794,155.

The operator 24 in the box 11 is preferably like that disclosed in my Patent No. 1,946,715.

The operator has a cylinder 25 and a piston 26. The space 27 between the piston and the opposed head 28 of the cylinder constitutes an operating chamber. This chamber, the hydraulic lines 22 and the chambers 23 of the servo-motors are completely filled with oil or other liquid, which in the operation of the system has an oscillatory movement between the operating chamber and the servo-motor chambers. All liquid expelled from the operating chamber to open one or more of the safety valves of the tank compartments returns to the operating chamber with the closing of the safety valves.

The springs 17 of the safety valves, or other forces acting on these valves to close them, could return the liquid to the operator and return the piston 26 to its normal position, but to aid and hasten the operation a return spring 29 is preferably placed in the operating chamber to press back the piston.

The operating chamber has a single opening 30 for expulsion and return of liquid, and the nipple 31 screwed in this opening is connected with the various hydraulic lines in a manner which will be described.

As the operator, which is here shown for illustration, is fully described in my earlier application already mentioned, it will be sufficient to speak briefly of its parts and operation. The piston 26 has a rearwardly extending skirt 32 in which is telescoped another piston-like element 33. Secured to the latter is an operating rod 34 which extends through the back head of the cylinder. The piston 33 can move relatively to the piston 26, even though the latter remain stationary, and a spring 35 interposed between the two piston elements serves as a yielding thrust connection. The operating chamber 27 which exists when the piston 26 is at its extreme rear position is of sufficient capacity for opening all six of the safety valves 13 simultaneously. When only one valve, or a combination of valves less than the entire number, is to be opened, the piston 26 makes a lesser forward travel, and when it ceases to move, further movement of the piston 33 and rod 34 merely compresses the spring 35.

On the rear end of the rod 34 is a collar 36 which is adapted to be engaged by an automatic spring-actuated detent 37, to hold the operator in the operated condition with one or more of the tank safety valves open. The detent catches behind the collar 36 when the rod is pushed in. Release of this detent, either by hand or by the closing of the door 12, permits the safety valves 13 to be closed and the piston 26 to be retracted by their springs. The piston is pushed forward by means of a lever 38 which acts on the rear end of the rod 34.

To the lower end of the nipple 31, constituting the outlet and return connection of the operator, a manifold 40 is connected. In the preferred form of execution of the invention there are two manifolds, though this is not essential. The other manifold is marked 41, and it is shown cross-connected with the manifold 40 by a nipple 42.

Six fittings are shown connected to each of the manifolds, the fittings 43 extending downward from the manifold 40 containing check-valves 44 and the fittings 43ª extending downward from the manifold 41 containing stop-cocks 44ª.

Each of the hydraulic lines 22 is connected with a valve 44 and a valve 44ª and through these valves with the operator. With separate manually-operated and automatic valves, as shown, the valves are in parallel or by-pass relation each to the other. Thus, the several lines 22 are shown connected with T's 45 on the lower ends of the branches 43, short lengths 46 of this same copper tubing connecting said T's with the lower ends of the branches 43ª.

In order to unload any given compartment of the tank, the attendant turns the handle 47 of the control valve 44ª corresponding to that compartment to a vertical position (assuming that the horizontal position is "closed"). The handles 47 being in a bank, it is easy to select the proper handle. Thus, in order to unload number 1 compartment, the attendant turns the first handle of the series, and similarly for any other compartment. He then forcibly operates the lever 38 of the operator, advancing the piston 26 and expelling liquid and creating pressure through the opened manual control valve 44ª, and through the corresponding line 22 to the servo-motor of the safety outlet valve of number 1 compartment, opening this valve. The detent 37 holds the piston, the servo-motor and the safety valve in this condition, until the detent is released.

The pressure can not act through the manifold 41 and the other branches 43ª and lines 22, because the other valves 44ª are closed. Pressure also exists in the manifold 40, but it can not act past the check-valves 44, because these valves open automatically toward the operator and close automatically away from it. Consequently, pressure exerted from the operator only holds these valves more tightly closed.

When the operator piston is released and is restored to its normal position, the return flow or oscillation of the liquid would pass the open stopcock 43ª, if it were still open; but the attendant might inadvertently close that valve before releasing or retracting the piston of the operator. In that event, the corresponding check-valve 43 will open and permit the return of liquid to the operator and the expulsion of a like amount from the chamber of the servo-motor of the open safety valve 13, so that this safety valve closes.

From the foregoing it will be evident that the safety valves may be opened in any combination of two, three or more, up to the entire number of compartments, by simply moving the required handles 47 to the open position, and operating the operator, and that when the operator is restored to normal condition any opened safety valves, whatever the combination, are closed, irrespective of the then positions of the handles 47 or of the valves 44ª.

I claim:

1. Hydraulic apparatus for operating all or any one or any combination of a plurality of valves, comprising the combination of servo-motors for each of such valves, an operator having an operating chamber from and to which liquid is expelled and returned, a plurality of hydraulic lines each of which is connected with one of said servo-motors and all connected with said operating chamber, and valve means comprising a combination of a manually-operated element and an automatic check-valve for each of said hydraulic lines, said manually-operated elements being operable to close all lines, or any one or any combination of the lines, and not others, against flow from the operator to the servo-motors, said check-valves opening in a direction to allow liquid to flow toward the operating chamber irrespective of the positions of the corresponding manually-operated elements so that an attendant can close all of the open motor-operated valves by manipulation of the operator.

2. Hydraulic apparatus for operating all or any one or any combination of a plurality of valves, comprising the combination of servo-motors for each of such valves, an operator having an operating chamber provided with a single outlet and return opening, a plurality of hydraulic lines each of which is connected with one of said servo-motors and all connected with said opening, manually-operated valves each of which is connected with one of said lines, connections between said lines and said opening by-passing said manually-operated valves, and automatic means in said by-pass connections for preventing flow from the operating chamber but allowing flow toward said operating chamber so that liquid can be drawn into the operating chamber through said single opening and the pressure in all operated servo-motors released regardless of the position of the manually-operated valves.

3. Hydraulic apparatus for operating all or any one or any combination of a plurality of valves, comprising the combination of servo-motors for each of such valves, an operator having an operating chamber from and to which liquid is expelled and returned, a plurality of hydraulic lines each of which is connected with one of said servo-motors and all connected with said operating chamber, manually-operated valves each of which is connected with one of said lines, connections between said lines and said operating chamber by-passing said manually-operated valves, and check-valves one in each of such by-passing connections, said check-valves opening in a direction to allow liquid to flow toward the operating chamber irrespective of the positions of the corresponding manually-operated elements so that an attendant can close all of the open motor-operated valves by manipulation of the operator.

4. Hydraulic apparatus for operating all or any one or any combination of a plurality of valves, comprising the combination of a servo-motor for each of such valves, an operator having an operating chamber from and to which liquid is expelled and returned, a plurality of hydraulic lines each of which is connected with one of said servo-motors, two manifolds connected with said operating chamber, two sets of branches of said lines connected respectively with said manifolds, a manually-operated valve in each branch of one set, and check-valves in the branches of the other set, said check-valves opening in a direction to allow liquid to flow toward the operating chamber irrespective of the positions of the corresponding manually-operated elements so that an attendant can close all of the open motor-operated valves by manipulation of the operator.

5. Hydraulic apparatus for operating all or any one or any combination of a plurality of valves, comprising the combination of a servo-motor for each of such valves, an operator having an operating chamber provided with a single outlet and return opening, a plurality of hydraulic lines each of which is connected with one of said servo-motors, two manifolds, means including a cross-connection between the manifolds for connecting both manifolds with said opening to the operator, T's connected with said lines, a set of fittings connecting said T's with one of the manifolds, another set of fittings connecting said T's with the other manifold, manually-operated valves in the fittings of one set, and check-valves, which close away from and open toward the operating chamber, in the fittings of the other set so that liquid from the servo-motors of all open valves can be drawn through the lines toward the operator to cause the valves to close irrespective of the manually-operated valves.

6. The combination with a plurality of automatically closing valves to be controlled and hydraulic servo-motors for opening said valves, of a hydraulic operator adapted to expel liquid and to receive return of liquid, hydraulic lines connecting said operator with said servo-motors, a plurality of manually-operated devices each of which is associated with one of said lines for opening the same to permit flow from the operator to the servo-motors, and automatic check-valve means interposed between the lines and the operator and disposed to prevent outflow except through the line or lines opened by said manually-operated devices and to permit return flow, so that all of said valves can close, irrespective of the positions of the manually-operated devices, when the operator is restored to the normal condition.

7. The combination with a truck-tank comprising a plurality of compartments each provided with an outlet, normally closed safety valves commanding said outlets, of fluid-pressure-actuated devices for opening said safety valves, lines connected with the several fluid-pressure-actuated devices, an operating chamber and means for creating fluid-pressure in said chamber and through said lines to open the safety valves, manually-operated devices associated one with each of said lines for opening the same to the transmission of pressure from the operating chamber to the fluid-pressure-actuated devices, and check-valve means adapted to prevent transmission of such operating pressure through any lines not opened by said manually-operated devices and to permit return flow from all lines so that all opened safety valves close, irrespective of the positions of the manually-operated devices, when the condition in the operating chamber is changed to bring about closing of any opened safety valve.

8. The combination with a truck-tank comprising a plurality of compartments each provided with an outlet, and hydraulically-operated safety valves commanding said outlets, of hydraulic lines leading to the actuating chambers of the several safety valves, an operator adapted to expel liquid through any one or more of said lines to open said safety valves, manually-operated devices associated one with each of said lines for opening the same to flow from the operator to said actuating chambers, and automatic check-valve means interposed between the lines and the operator so as to prevent outflow except through the line or lines opened by said manually-operated devices and to permit return flow from all lines so that all opened safety valves close, irrespective of the positions of the manually-operated devices, when the operator is restored to the normal condition.

9. In fluid-controlled apparatus for operating all or any one or any combination of a plurality of valves, the combination comprising a plurality of servo-motors one for each of such valves, an operating chamber, means for changing the pressure of a fluid within said chamber, a plurality of lines, one for each of said servo-motors and connecting said servo-motors with said chamber, manually-operated valves, one in each of said lines, by-pass connections, one for each of said manually-operated valves, and automatic means associated one each with said by-pass connections preventing transmission of fluid therethrough in a direction to operate the connected servo-motor to open its associated valve, but permitting transmission of fluid in the reverse direction so that all of the motor-operated valves can be closed by operating the pressure-changing means regardless of the position of said manually-operated valves.

10. The combination with a truck-tank comprising a plurality of compartments each provided with an outlet, and normally closed safety valves commanding said outlets; of fluid-actuated servo-motors for opening said safety valves, an operating chamber, means for changing the pressure in said chamber, lines connecting said chamber with each of said servo-motors, manually-operated devices assocaited one with each of said lines and operable to establish communication through the line between said chamber and a servo-motor, and means including a check-valve connected with each of said lines and adapted to prevent transmission of the operating fluid in a direction to operate the said servo-motors of any lines not opened by said manually-operated devices, but opening in a direction to permit return flow from the servo-motors to the chamber, irrespective of the positions of the manually-operated devices, whenever the pressure in the operating chamber is changed to bring about closing of any opened safety valve, so that operation of the pressure-changing means to close any open safety valve causes all open safety valves to close.

PAUL S. SHIELD.